Patented Oct. 24, 1950

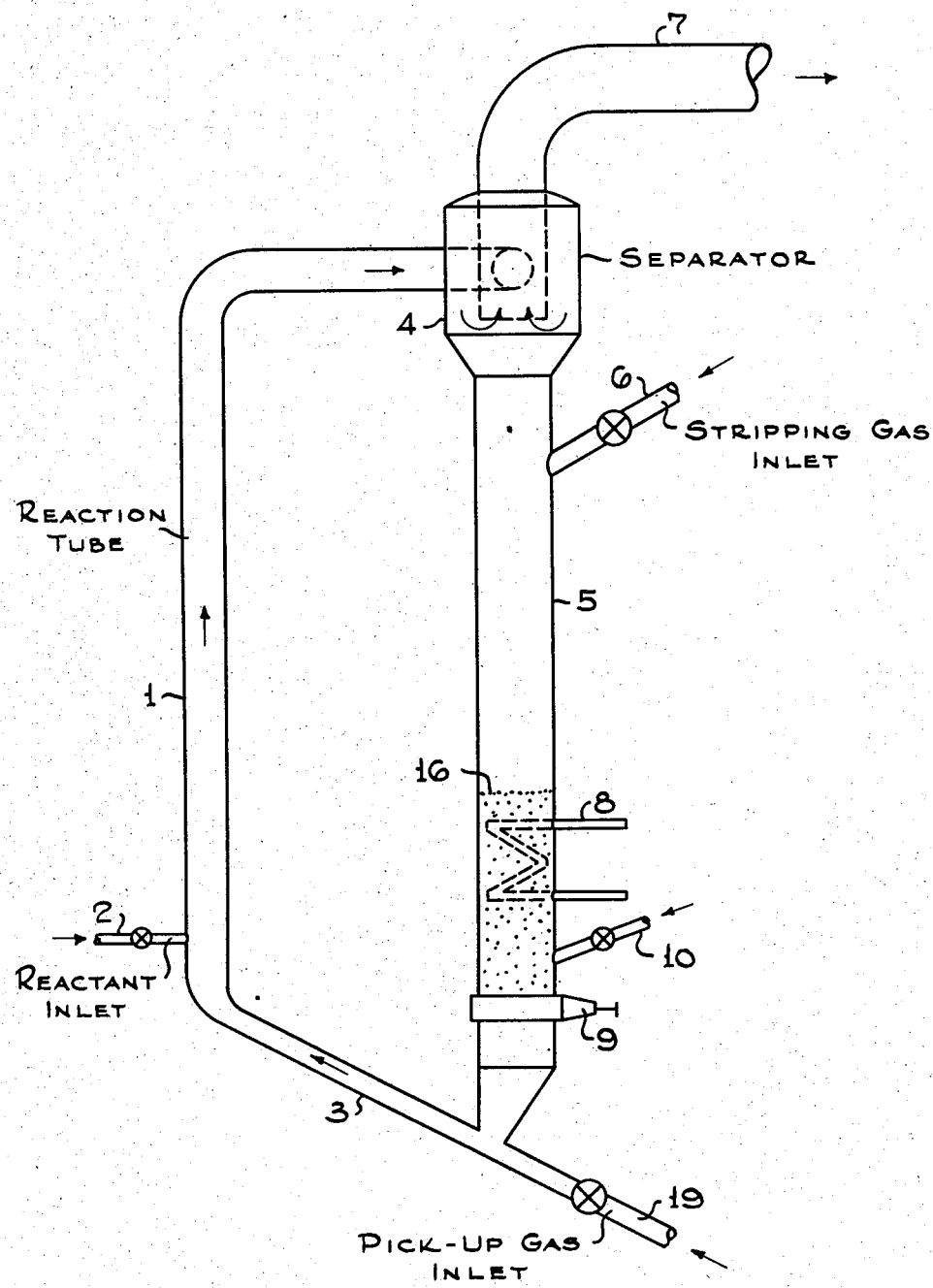

2,526,689

UNITED STATES PATENT OFFICE 2,526,689

PROCESS FOR CONTROLLED CATALYTIC OXIDATION

Walter F. Rollman, Cranford, N. J., assignor to Standard Oil Development Company, a corporation of Delaware Application July 30, 1948, Serial No. 41,607

7 Claims. (Cl. 260—342)

This invention relates to an improved method for conducting a vapor phase reaction requiring high precision control of temperature and contact time with a suspended catalyst.

This invention is a method of carrying out a catalytic vapor phase reaction wherein the catalyst maintained at a critically controlled temperature is carried in suspension at a comparatively high velocity and concurrently with a stream of reactant vapor through a reaction zone for a relatively short reaction period then is abruptly disengaged from product and unreacted vapors by a stripping gas near the exit of the reaction zone, reactivated, and returned at the reaction temperature to the reaction zone. Thus the exposure of the feed vapors to the catalyst under the desired reaction conditions is made rapid, quite uniform, and can be closely controlled.

Extensive investigations of very selective reactions, as for example, the partial oxidation of an aromatic compound, such as naphthalene or o-xylene to phthalic anhydride, shows that these reactions are best accomplished when the reactant vapors are in contact with active catalyst of reaction temperature for a limited and controlled period of relatively short duration and when the vaporous products, after being formed, are abruptly disengaged from the catalyst. These requirements are not completely met in conventional fluid catalyst systems on account of entrapment, turbulence and backlash in the reaction zone, and recirculation of vapor products with the catalysts at varying stages of activity under conditions which tend to promote further and unwanted reactions.

The method of processing for accomplishing the desired objectives in accordance with the present invention can be carried out in an apparatus of simple construction and operation, yet the method is very flexible with close control of all necessary reaction conditions entirely possible.

An embodiment of the invention will be described with reference to the accompanying drawing, in which an elevational view of a useful type of reaction vessel with accessory parts is schematically shown.

Referring to the drawing, the reaction tube 1 consists simply of a tubular conduit into one end of which is fed reactant vapor plus usually some carrying gas from line 2 and suspended catalyst of proper activation and temperature for immediately initiating reaction from line 3 and which discharges at its other (outlet) end into a separator, such as a cyclone separator 4. Spent catalyst is disengaged abruptly from the vapor in the separator, then falls down a catalyst receiving vessel or standpipe 5, at the lower portion of which it is collected in section 16. Stripping gas injected into standpipe 5 from line 6 close to the separator 4 serves to remove quickly and thoroughly the entrained vapors from the separated catalyst. Vapor products mixed with stripping gas or steam leave the separator through pipe 7 to a suitable recovery unit (not shown), which may include conventional means, such as a condenser or scrubber. Coil 8 may be either a heater or a cooler to control the temperature of the catalyst at a point not less than that of the minimum in the reaction zone. This minimum temperature is about 800° F. for oxidation reactions employing vanadium oxide catalysts. A slide valve 9 is provided at the bottom of the standpipe 5 for regulating flow of the catalyst to the pick-up line 3. An inlet 10 admits a gas having an oxidizing action to reoxidize the catalyst and to fluidize the mass of catalyst so that it will flow smoothly back to the reaction zone. Oxygen-containing gas, such as air, or free oxygen mixed with steam gives the desired oxidizing action. A pick up gas, such as air, is injected into the pick-up line 3 from line 19 to aid in returning the reoxidized catalyst to the reactor.

This type of operation can be used for many types of reactions in which solid catalysts or carriers are employed. It is especially adaptable for use in various types of catalytic oxidations where only partial oxidation is desired and high selectivities are required for good yield and purity results.

The process is especially applicable to oxidations of aromatic compounds such as naphthalene, orthoxylene, or other ortho substituted benzenes, to give phthalic anhydride. The process can be used advantageously for catalytic oxidation of benzene or $C_4$ fractions containing butenes to give very good yields of maleic anhydride. Butadiene can also be used as feed to give the same anhydride. It is well known that benzene can be subjected to a controlled partial oxidation to yield maleic anhydride. Thus, using this process, benzene can be oxidized to give good yields of maleic anhydride.

In addition to these examples of selective oxidations, many other such reactions may be advantageously carried out using this process. These reactions may be either of the endothermic or the exothermic type. The selective oxidation of ortho-toluic acid to phthalic acid is conveniently done by this process. It is possible to oxidize certain heterocyclic compounds containing side chains to yield carboxylic derivatives using this selective procedure. Other oxidations which may be carried out using this process include conversion of ethylene to ethylene oxide using a silver containing catalyst and the conversion of propylene to acrolein using a copper oxide catalyst. Various other types of such reactions will suggest themselves to those familiar with the art.

In the oxidation of compounds, such as naphthalene or o-xylene, to form phthalic anhydride or oxidation of a $C_4$ fraction to give maleic anhydride, the desired high selectivity is obtained under conditions such that the reactant vapor is contacted with the suspended catalyst for relatively short time periods at temperatures in the range of 800° F. to 1100° F. The reaction temperature which can most advantageously be used depends somewhat on the concentration of reactant vapor in the feed to the oxidation zone.

One of the most important advantages obtained by using this procedure is that higher feed concentrations can be used than with any other type of process now in use. The minimum concentration rate desirable using this improved method is about 1.5 mol per cent which is the usual maximum possible for the fixed bed operations. Higher concentrations up to about 2.5 mol per cent feed concentrations can be employed satisfactorily. This increased through put rate offers obvious operational advantages in time and equipment decreases and increased output per oxidation unit.

For the lower feed rate, somewhat higher optimum temperatures are desirable. Those in the range of 950°–1100° F. have been found to be useful. For the higher feed concentrations, it is necessary to employ lower temperatures in the reaction zone. In this case temperatures of 800°–930° F. have been used.

The entrainment of vapors with the moving catalyst particles which usually occurs in this type of operation, may be visualized as a carrying along with each particle of a vapor film. Such entrained vapors are difficult to remove while the catalyst is moving fairly rapidly. However, the entrained vapor film is readily removed from the catalyst as it drops from disengaged vapor products by a stripping gas. This stripping gas may be steam, or even a gas having some oxidizing action such as air may be used. The stripping gas is preferably introduced as a cross current approximately normal or perpendicular to the plane of movement of the falling solid catalyst particles. Also, dilution of the vapor products with such a stripping gas as the products are discharged from the reaction zone may be helpful in partial quenching of the reaction while at the same time aiding in abrupt disengagement of the suspended catalyst from the vapor products.

Data obtained in the study of this process indicates that degradation reactions occur more frequently if steps are not taken to restrict the oxidation substantially to the reaction zone. Hence, it is highly essential to obtain the rapid and thorough stripping of vapors from catalyst leaving the reaction zone in order to obtain from the process its maximum efficiency.

For the type of operation described, relatively coarse and heavy catalyst particles are suitable. No special provision is therefore necessary for recovery of fine catalyst particles. Particles of size range from 20 to 80 mesh are in general, entirely suitable.

A particularly valuable form of catalyst which has been found very useful in this type of operation is produced by fusing the catalyst and subjecting it to rapid cooling under such conditions that it assumes a spherical shape. These so-called microspheres are easily made and circulate and disengage freely at reasonable vapor velocities. They are also free of attrition difficulties such as occur frequently in using supported catalysts. Microspheres of from 40 to 80 mesh size have been used quite satisfactorily. Catalysts of 100–140 mesh size have not been found to be quite so satisfactory since such small particles are relatively more difficult to separate from the product vapors and because of catalyst loss and deactivation, a lower selectivity is observed after several successive runs. In carrying out this improved process, very simple catalyst forms may be employed. This, of course, offers advantages from the economical and operational standpoints.

Numerous modifications suggest themselves. The inlet lines for reactants and stripping gas can be varied in number and position. The catalyst loading in pick-up gas and rates of flow of vapors and gas in the system may be controlled at will. A number of reaction tubes may be used together in one unit to obtain increased capacity. In some cases it may be desirable in the interest of mechanical simplicity to construct the reaction zone as a central tube within the standpipe, catalyst being drawn into the reaction zone through a space between the open lower end of the central tube and the bottom of the standpipe,

*Table I*

| Operation | A<br>Suspended Catalyst Concurrent Flow | B<br>Commercial Fixed Bed |
|---|---|---|
| Reactor | 0.55" I. D. | ¼". |
| Standpipe | 0.96" I. D. | |
| Catalyst | 100% Vanadium Oxide microspheres. | Vanadium Oxide on Corundum. |
| Size, mesh | 40–60 | 4–10. |
| Av. Reaction Zone Vapor Temp., °F. | 1,000 | 750–950 (Jacket). |
| Cyclone Metal Temp., °F | 826 | |
| Feed Conc.—Mol per cent Naphthalene in Air. | 1.5 | 1. |
| Catalyst, Conc., lbs./cu. ft. | 2.2 | |
| Contact Time, sec. | 0.7 | 0.1–0.5. |
| Vapor Velocity in Reactor, ft./sec. | 12.2 | |
| Stripping Medium | Steam | Reactant Gases. |
| Vapor Velocity up Standpipe, ft./sec. | 1 | |

PRODUCT DISTRIBUTION (OUTPUT BASIS)

| | | |
|---|---|---|
| Phthalic Anhydride, Mol per cent | 86.3 | 76. |
| Maleic Anhydride, Mol per cent | 10.6 | 3. |
| Net $CO+CO_2$, mol per cent | 0.6 | 19. |
| Conversion, per cent | 98.4 | 100. |
| Selectivity, per cent | 87.7 | 76. | and disengaging from the reactant gases by gravity in the low-vapor-velocity space within the standpipe above the central reaction tube.

Test data on the short contact concurrent flow of suspended catalyst operation as applied to the specific example of phthalic anhydride production and comparative data for a commercial fixed bed operation are presented in Table I.

It can be readily seen in the above summarized data that the described concurrent flow operation has a considerable advantage in selectivity and yield compared to a conventional fixed bed operation. The conventional fluid catalyst process with turbulent contact for non-uniform periods above 1 second gives a yield of only about 65%.

The above data demonstrate further the very important advantage for the process of the present invention in that its feasible feed concentration is well above that which can be used in the conventional fixed bed process.

Other aromatic compounds may also serve as feed stocks for obtaining phthalic anhydride by oxidation. Various types of ortho substituted benzenes can be used. The data in Table II was obtained employing 96% ortho-xylene as the feed stock and using the suspended catalyst concurrent flow technique with 40–60 mesh fused vanadium oxide catalyst.

Table II

| Operation | A | B |
|---|---|---|
| Contact Time, sec | 0.4 | 0.4 |
| Av. Temperature, °F | 995 | 950 |
| Steam Dilution, Mol percent | 55 | 31 |
| Feed Conc.—mol percent Xylene in Air | 2.2 | 1.4 |

PRODUCT DISTRIBUTION

| | | |
|---|---|---|
| Total Acids, Mol Per Cent | 63 | 56 |
| Phthalic Anhydride | 48 | 46 |
| Maleic Anhydride | 15 | 10 |
| $CO+CO_2$ Mol Per Cent | 27 | 16 |
| Conversion, mol Per Cent | 93 | 76 |
| Selectivity to Phthalic Anhydride | 54 | 63 |

A study of the data obtained with ortho-xylene in comparison with that on naphthalene indicates that higher temperatures or preferably, longer contact times gives better yields and selectivities. At 1.4 mol per cent feed concentration a selectivity of 75% is obtained from ortho-xylene and, at the somewhat higher feed concentration of 2.5 mol per cent a maximum selectivity of 60% conversion to phthalic anhydride may be expected.

Data has also been obtained on the concurrent flow of suspended catalyst technique using as the specific example oxidation of a butenes concentrate fraction such as can be produced in refinery operations and having the following composition by analysis:

| | | |
|---|---|---|
| Total Butenes, per cent | 94.3 | |
| Butene-2 | | 62.2 |
| Trans | | 35.0 |
| Cis | | 27.2 |
| Butene-1 | | 25.8 |
| Isobutene | | 5.2 |
| Butadiene | | 1.1 |
| Total Butanes, per cent | 5.6 | |
| Normal Butane | | 3.4 |
| Isobutane | | 2.2 |
| $C_5+$ | 0.1 | |

Using a feed of this type the data in Table III was obtained using a 40–80 mesh molybdenum-vanadium oxide catalyst in a suspended concurrent flow reactor.

Table III

| Operation | Runs | | | | | |
|---|---|---|---|---|---|---|
| | 1 | 2 | 3 | 4 | 5 | 6 |
| Av. Reaction Zone Vapor Temp., °F | 950 | 900 | 900 | 900 | 900 | 950 |
| Feed Conc.—Mol per cent Butenes in Air | 1.4 | 1.4 | 1.4 | 1.4 | 1.4 | 3.0 |
| Catalyst Conc., lbs./cu. ft. | 0.8 | 1.4 | 1.4 | 1.0 | 1.4 | 0.9 |
| $MoO_3$ in Catalyst Charged—mol per cent | 34.2 | 34.2 | 9.4 | 34.2 | 34.2 | 34.2 |
| Contact Time, sec | 0.5 | 0.5 | 0.5 | 0.5 | 0.3 | 0.6 |
| Oxygen in Catalyst Aeration Medium, mol per cent | 6.0 | 6.0 | 6.0 | 6.0 | 20.9 | 6.0 |

PRODUCT DISTRIBUTION (INPUT BASIS)

| | | | | | | |
|---|---|---|---|---|---|---|
| Total Acids, Mol per cent | 16.6 | 19.3 | 19.9 | 14.9 | 19.2 | 16.1 |
| Maleic, mol per cent | 13.8 | 15.1 | 15.8 | 11.1 | 16.0 | 12.8 |
| $CO+CO_2$, mol per cent | 18 | 35 | 32 | 25 | 25 | 30 |
| Conversion, mol per cent | 97 | 86 | 100 | 93 | 93 | 83 |
| Selectivity to Total Acids, mol per cent | 17 | 22 | 20 | 16 | 21 | 19 |
| Selectivity to Maleic Acid, mol per cent | 14 | 18 | 16 | 12 | 17 | 15 |

Vanadium oxide catalyst alone gave equal and in some cases somewhat superior results as did the vanadium oxide-molybdenum oxide mixed catalysts. This substitution of catalysts results in much lower yields when using fixed catalyst bed type operations. This gives an obvious working advantage since the vanadium oxide alone would obviously be the cheaper catalyst.

A further advantage shown by the above data is that here, too, feed concentrations can be materially increased over those possible using a fixed bed reactor. Total acid yield is not affected in the process of the present invention and operating in this manner, there is an appreciably lower amount of oxidizing gas required and if air is used a correspondingly smaller amount of fixed gases passing through the reactor and recovery system.

Studies of data from many experimental runs, as, for instance, the data cited, demonstrated that degradation of product or excessive reaction occurs through prolonged and non-uniform contact of vapors and catalyst and that this degradation is minimized by using a suspended catalyst with concurrent flow technique which minimizes slippage and recirculation of the suspended catalyst within the reaction zone and brings about quick disengagement of the catalyst from the reaction products. In this way, product degradation is substantially avoided.

It has been found that with regulated pick-up of catalyst in a stream wherein turbulence is eliminated or greatly minimized, one of the outstanding advantages of the arrangement shown, substantially no attrition of the catalyst occurs.

After the product vapors have been substantially completely stripped from the catalyst and the catalyst has collected in the standpipe as a relatively dense mass, a fluidizing gas is advantageously introduced into the catalyst mass to keep it free-flowing. Further, it is advantageous to introduce an oxidizing gas to restore the catalyst to its higher state of oxidation. In the case of vanadium oxide catalysts this necessitates oxidizing the catalyst substantially to $V_2O_5$ from a lower state such as $V_2O_4$. Preferably the fluidizing gas and the oxidizing gas are injected at the same inlet and, ideally, both actions are accomplished by the same gas. Air is one such gas having the desired combination action. Steam mixed with air or free oxygen can also be used.

Steam alone does not have sufficient oxidizing action on the more difficultly reducible heavy metal oxides preferred as catalyst, such as oxides of vanadium, molybdenum, and chromium although steam alone may be used to oxidize the more readily reducible metal oxides, such as oxides of iron.

The temperature of the catalyst during its passage in the standpipe is very important. Under no circumstances should it be allowed to fall below the minimum allowable temperature of the reaction zone. For oxidation reactions, this means the catalyst must be at a temperature of at least 800° F. In some cases heat may need to be added or removed to facilitate operation under such controlled conditions. If the temperature is not so maintained, the cool catalyst would not be satisfactorily reactivated and would enter the lower portion of the reaction zone admixed with reactant vapor under conditions whereby only very sluggish reaction would take place. Reaction might not take place at all if cooling were intensive. This would result in a highly inefficient and unfeasible process.

The reactivated catalyst which is transferred to the inlet of the reaction zone becomes uniformly dispersed in the stream of reactant vapor or gaseous reaction mixture which may include a carrier gas, e. g., steam or inert gas, and may include oxidizing gas, e. g., air or oxygen. The catalyst particles maintain a relatively fixed position in the stream in which they flow concurrently with the reactant vapor. Thus, catalyst slippage is minimized and practically unidirectional movement of the catalyst is obtained by appropriate adjustment of variables such as catalyst particle size, catalyst loading of the vapor stream, and vapor velocity. Residence times for the reactant vapor and catalyst in the reaction zone are substantially the same. By having the reaction zone contained in a tube of uniform cross section from its inlet to its discharge end and with relatively uniform charging rate the distribution of the suspended catalyst is made more uniform throughout the reaction zone and unidirectional movement of the catalyst is facilitated.

In using the method described it has been found possible to conduct partial and selective oxidation of organic compounds without having an oxidizing gas admixed with the organic reactant. In such an operation the catalyst is properly reactivated in the standpipe to a high state of oxidation and acts as an oxygen carrier. Provisions may be made in such an operation to withdraw spent oxidizing gas from the standpipe at a suitable point above the catalyst being reactivated, or above level 16, and below the stripping gas inlet 6 so that such spent gas does not admix with gaseous or vapor product withdrawn from the separator 4.

This application is a continuation-in-part of my application, Serial Number 662,907, filed April 17, 1946, now abandoned.

What is claimed is:

1. The method of catalytically reacting a hydrocarbon in vapor phase for a precisely controlled contact period to obtain selective partial oxidation of said hydrocarbon, to yield oxy-organic products which comprises flowing reactant vapor of said hydrocarbon in a continuous stream through a reaction zone, contacting the vapor in the stream with concurrently flowing catalyst suspended in the stream for a controlled uniform contact period, the catalyst flowing unidirectionally at a uniform velocity with the vapor throughout the reaction zone, disengaging the suspended catalyst from vapor at the end of the reaction zone, simultaneously stripping vapor from the catalyst being disengaged, collecting a dense suspension of the stripped catalyst, reactivating said stripped catalyst in suspension and transferring the thus-collected catalyst out of contact with the reactant vapor undergoing reaction to an inlet end of the reaction zone where the reactivated catalyst at reaction temperature becomes suspended again in reactant vapor entering the reaction zone.

2. The method of catalytically reacting a hydrocarbon for a precisely controlled contact period for oxidation of said hydrocarbon to yield oxy-organic products which comprises flowing reactant vapor of the hydrocarbon in a continuous stream up through a reaction zone, contacting said vapor with concurrently flowing suspended catalyst for a controlled short contact period in the reaction zone, the velocity of the suspended catalyst being substantially the same as the velocity of the reactant vapor up through the reaction zone, separating the catalyst from vapor discharged from the reaction zone, stripping vapor from the catalyst as it is separated from the vapor stream discharged from the reaction zone, and returning the stripped catalyst at a temperature of at least the minimum of the oxidation reaction to the reaction zone for suspension in the reactant vapor stream entering the reaction zone.

3. The method of partially oxidizing a hydrocarbon catalytically in vapor phase for a precisely controlled contact period to yield an organic product having at least one oxy group per molecule, which comprises flowing reactant vapor of the hydrocarbon mixed with an oxidizing gas in a continuous stream upwardly through a reaction zone, contacting said stream of reactant vapor with a concurrently flowing suspended catalyst in practically unidirectional movement at uniform velocity with the vapor for a controlled short contact period in the reaction zone at maintained reaction temperature, abruptly separating suspended catalyst from vapor discharged from the reaction zone, stripping vapors from the thus separated catalyst with a counter-current stream of stripping gas as the catalyst falls, contacting the stripped catalyst with a stream of oxidizing gas to effect reactivation, transferring the reactivated catalyst maintained at a temperature of at least the minimum in the reaction zone to an inlet of the reaction zone, and suspending the reactivated catalyst in the stream of reactant vapor that is passed upwardly through the reaction zone.

4. The method of partially and selectively oxidizing an aromatic hydrocarbon in vapor phase with a suspended solid catalyst for a controlled reaction period to yield an organic product having at least one oxy group per molecule, which comprises suspending a vanadium oxide-containing catalyst in a continuous stream of the aromatic hydrocarbon as reactant vapor entering a reaction zone, flowing the suspended catalyst at the same velocity with the stream of vapor and with substantially unidirectional motion up through the reaction zone in which an elevated reaction temperature is maintained, abruptly separating the suspended catalyst from vapors discharged from the upper end of the reaction zone, immediately stripping vapor from the separated catalyst with a cross current of gas, reoxidizing the catalyst by a stream of oxidizing gas, and transferring the stripped reactivated catalyst while it remains heated to a temperature required in the reaction zone to the lower end of the reaction zone where the catalyst is again suspended in the entering stream of reactant vapor.

5. The method of catalytically oxidizing an aromatic hydrocarbon to produce phthalic anhydride, which comprises flowing vapor of the aromatic hydrocarbon at a concentration of 1.5 to 2.4 mol per cent in admixture with an oxygen-containing gas in a continuous stream up through a reaction zone, concurrently flowing in the stream of vapor and gas suspended vanadium oxide catalyst particles of about 20–80 mesh in the reaction zone at a temperature in the range of 800°–1100° F., abruptly separating the suspended catalyst from vapor discharged from the reaction zone, immediately stripping vapor from the separated catalyst particles as they fall through a perpendicularly injected current of stripping gas, collecting the catalyst particles stripped of vapor, maintaining the collected particles at a temperature of at least 800° F., reactivating the catalyst particles at a temperature of at least 800° F., and transferring the reactivated catalyst particles to the reaction zone where they are again suspended in a stream of the vapor of the aromatic hydrocarbon.

6. The method of partially oxidizing a gaseous hydrocarbon with a suspended catalyst in reaction of controlled uniform contact period to yield an organic polycarboxylic acid anhydride during which reaction the catalyst loses oxidation activity which comprises passing through a reaction zone a continuous stream of the gaseous hydrocarbon, carrying the solid catalyst in suspension at uniform unidirectional velocity, the catalyst being at temperature of reaction throughout said reaction zone, discharging a gaseous product stream carrying the solid catalyst in suspension from the discharge end of the reaction zone into a separation zone, immediately disengaging and stripping gaseous product from the solid catalyst by a stream of stripping gas, contacting the stripped catalyst at a temperature of the oxidation reaction with an oxygen-containing gas, whereby said catalyst is reactivated, and recycling the reactivated catalyst into the stream of the gaseous hydrocarbon, said reactivated catalyst being at a higher state of oxidation than the catalyst in suspension at the discharge end of the reaction zone.

7. The method of partially oxidizing a hydrocarbon reactant vapor with a suspended catalyst in a reaction zone for a controlled uniform contact period at a reaction temperature of at least 800° F. to yield an organic polycarboxylic acid anhydride, which comprises passing the catalyst suspended in the hydrocarbon reactant vapor unidirectionally and at uniform velocity through the reaction zone, discharging the catalyst thus carried in suspension by vapor to an upper end of the reaction zone directly into a disengaging zone in which the catalyst is precipitated downwardly and its carrying current of vapor is drawn off separately, contacting a current of stripping gas with said catalyst as it is precipitated downwardly from the disengaging zone, to strip any remaining organic reactant and product vapor therefrom while said catalyst temperature is still at least 800° F., collecting the precipitated catalyst thus stripped free of organic reactant and product vapor in a reactivation zone, contacting said catalyst collected in the reactivation zone with oxidizing gas while the catalyst temperature is maintained at above 800° F., and passing freshly reactivated catalyst at above 800° F. from said reactivation zone into a stream of hydrocarbon reactant vapor entering the reaction zone, whereby each portion of said entering hydrocarbon reactant vapor is contacted initially with freshly reactivated catalyst at a temperature suitable for starting the partial oxidation, and each part of the catalyst entering the reaction zone is fully discharged therefrom, then promptly separated from organic products at the same rate.

WALTER F. ROLLMAN.

REFERENCES CITED

The following references are of record in the file of this patent:

UNITED STATES PATENTS

| Number | Name | Date |
|---|---|---|
| 2,373,008 | Becker | Apr. 3, 1945 |
| 2,428,914 | Kassel | Oct. 14, 1947 |